(12) United States Patent
Kodama

(10) Patent No.: US 11,225,105 B2
(45) Date of Patent: Jan. 18, 2022

(54) SPOKE WHEEL

(71) Applicant: TOYOTA JIDOSHA KABUSHIKI KAISHA, Toyota (JP)

(72) Inventor: Aoi Kodama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 379 days.

(21) Appl. No.: 16/268,746

(22) Filed: Feb. 6, 2019

(65) Prior Publication Data

US 2019/0248178 A1 Aug. 15, 2019

(30) Foreign Application Priority Data

Feb. 9, 2018 (JP) .............................. JP2018-022144

(51) Int. Cl.
| | | |
|---|---|---|
| *B60B 21/10* | (2006.01) | |
| *B60B 21/02* | (2006.01) | |
| *B60B 3/10* | (2006.01) | |
| *B60B 3/02* | (2006.01) | |

(52) U.S. Cl.
CPC .............. *B60B 21/106* (2013.01); *B60B 3/02* (2013.01); *B60B 3/10* (2013.01); *B60B 21/023* (2013.01); *B60B 2900/1216* (2013.01); *B60B 2900/212* (2013.01); *B60B 2900/551* (2013.01); *B60Y 2200/11* (2013.01)

(58) Field of Classification Search
CPC ... B60B 21/023; B60B 21/106; B60B 21/104; B60B 21/04; B60B 3/02; B60B 3/10; B60B 2900/1216; B60C 13/002; B60C 13/02

USPC ................................................... D12/501, 204
See application file for complete search history.

(56) References Cited

U.S. PATENT DOCUMENTS

| | | | | |
|---|---|---|---|---|
| 6,513,560 B2* | 2/2003 | Roesgen | ............... | B60C 13/002 |
| | | | | 152/513 |
| 6,896,336 B2* | 5/2005 | Hodges | ................. | B60B 21/104 |
| | | | | 301/95.101 |
| 6,913,323 B2* | 7/2005 | Bhambra | ................... | B60B 1/08 |
| | | | | 301/104 |
| 9,815,323 B2* | 11/2017 | Chenault, III | ............ | B60B 3/02 |

(Continued)

FOREIGN PATENT DOCUMENTS

| | | |
|---|---|---|
| JP | 2003-48403 | 2/2003 |
| JP | 2004-196005 A | 7/2004 |

(Continued)

*Primary Examiner* — Jason R Bellinger
(74) *Attorney, Agent, or Firm* — Oblon, McClelland, Maier & Neustadt, L.L.P.

(57) ABSTRACT

A spoke wheel includes a rim for supporting a tire having rim guards, a hub located radially inwardly with respect to the rim, and a plurality of spokes integrally connected with the rim and the hub at outer and inner ends, respectively, and extending radially with respect to the hub; a laterally outer surface of the outer end of each spoke and a laterally outer peripheral edge of the rim are located laterally inwardly with respect to a tip of a laterally outer rim guard; outer ends of main spokes among the spokes are provided with convex portions projecting laterally outwardly and extending in the radial direction, and a lateral position of a laterally outer tip of each convex portion lies in the range between a lateral position of the laterally outer peripheral edge of the rim and a lateral position of the tip of the laterally outer rim guard.

7 Claims, 6 Drawing Sheets

(56) References Cited

U.S. PATENT DOCUMENTS

| | | | |
|---|---|---|---|
| 10,427,472 B2 * | 10/2019 | Nagai | B60C 5/12 |
| 10,753,414 B2 * | 8/2020 | Zelenak | B60B 21/10 |
| 10,821,784 B2 * | 11/2020 | Bremmer | B60B 21/104 |
| 2008/0277998 A1 * | 11/2008 | Chen | B60B 21/025 |
| | | | 301/95.104 |
| 2011/0241414 A1 * | 10/2011 | Ono | B21K 1/32 |
| | | | 301/63.103 |

FOREIGN PATENT DOCUMENTS

| | | |
|---|---|---|
| JP | 2010-6135 A | 1/2010 |
| JP | 2010-274809 | 12/2010 |
| JP | 2013-71659 A | 4/2013 |
| JP | 2013-71660 | 4/2013 |

\* cited by examiner

SPOKE WHEEL

CROSS-REFERENCE TO RELATED APPLICATION

The disclosure of Japanese Patent Application NO. JP2018-22144 filed on Feb. 9, 2018 is incorporated by reference in its entirety.

BACKGROUND

1. Technical Field

The present disclosure relates to a spoke wheel for a vehicle such as an automobile.

2. Description of the Related Art

When a vehicle such as an automobile travels, air flows around the vehicle. If an air flow separates from the vehicle and vortex flows are generated, air resistance of the vehicle increases. Consequently, efforts to prevent an air flow from being separated from a vehicle as much as possible have been conventionally paid in order to reduce air resistance and improve a running performance of the vehicle.

For example, as described in Japanese Patent Application Laid-open No. 2010-274809, it has been proposed that a surface parallel to a plane perpendicular to a rotation axis of a wheel is provided from at least an outer sidewall portion to a bead portion of a tire in order to reduce separation of an air flow flowing around the wheel. According to this tire structure, an air flow flowing along at least the outer side surface of the tire flows substantially along the plane, so that it is possible to reduce the possibility that the air flow separates from the side surface of the tire and vortex flows are generated as compared to a general tire in which side wall portions bulge in the lateral direction of the wheel.

However, in a low profile tire having an aspect ratio set small in order to improve rigidity and running performance of a vehicle, since a radial length of each side wall portion of the tire is small, if the side wall portions are formed in a flat shape, the characteristics required for the tire cannot be secured. Consequently, the planar structure of the side wall portions cannot be applied to a low profile tire.

In a low profile tire, a rim guard for protecting a rim portion of a wheel supporting a tire and improving the strength of the tire is provided in each sidewall portion close to a bead portion. Each rim guard is formed integrally with the sidewall portion with rubber constituting the sidewall portion and extends around the entire circumference around an axis of the tire protruding from the sidewall portion. A tip of laterally outer rim guard is located on the side opposite to a lateral center of the rim portion with respect to a laterally outer peripheral edge of the rim portion. Therefore, an air flow flowing along the sidewall portion is separated from the sidewall portion and the wheel on the downstream side of the rim guard, and vortex flows are inevitably generated.

SUMMARY

The present disclosure provides a spoke wheel for supporting a tire having rim guards, which is improved to reduce the risk of an air flow flowing passing the laterally outer rim guard separating from the wheel.

According to the present disclosure, a spoke wheel is provided that comprises a rim for supporting a tire having rim guards, a hub located radially inwardly with respect to the rim, and a first plurality of spokes integrally connected with the rim and the hub at an outer end and an inner end, respectively, and extending radially with respect to the hub, laterally outer surfaces of the outer ends of the spokes and a laterally outer peripheral edge of the rim being located laterally inwardly with respect to a tip of the laterally outer rim guard.

Outer ends, of a second plurality of spokes of the first plurality of spokes are provided with convex portions projecting laterally outwardly and extending in the radial direction, and lateral positions of laterally outer tips of the convex portions lie in the range between a lateral position of the laterally outer peripheral edge of the rim and a lateral position of the tip of the laterally outer rim guard.

According to the above configuration, outer ends of the second plurality of spokes are provided with the convex portions projecting laterally outwardly and extending in the radial direction. The lateral positions of the laterally outer tips of the convex portions lie in the range between the lateral position of the laterally outer peripheral edge of the rim and the lateral position of the tip of the laterally outer rim guard. The wheel rotates at high speed when a vehicle is running, so that the second plurality of convex portions function like an annular protrusion continuously extending around a rotation axis of the wheel. Therefore, an effect equivalent to the fact that a space between the air flow on the downstream side of the laterally outer rim guard and the wheel becomes smaller can be obtained, so that vortex flows can hardly be generated in the region of the space, which enables to reduce the air resistance caused by vortex flows.

In addition, according to the above configuration, as the convex portions are provided at the outer ends of the second plurality of spokes, they are spaced apart from each other in the circumferential direction. Consequently, it is possible to reduce a weight of the wheel and to prevent the aesthetics of the wheel from deteriorating, as compared to where a convex portion extends over the entire circumference to form an annular shape.

Further, according to the above configuration, the lateral position of the laterally outer tip of each convex portion lies in the range between the lateral position of the laterally outer peripheral edge of the rim and the lateral position of the tip of the laterally outer rim guard. As compared to where the lateral position of the laterally outer tip of each convex portion lies on the laterally inner side than the lateral position of the laterally outer peripheral edge of the rim, a space between an air flow on the downstream side of the rim guard and the wheel can be reduced, so that it is possible to effectively reduce the possibility that vortex flows are generated in the region of the space. Conversely, as compared to where the lateral position of the laterally outer tip of each convex portion is on the lateral outside of the tip of the laterally outer rim guard, the possibility can be reduced that the convex portions become flow resistance against the air flow on the downstream side of the rim guard.

Further according to the above configuration, no special structural requirement such as forming a planar portion on an laterally outer sidewall portion of a tire is imposed on the tire. Therefore, it is possible to avoid deterioration of the performance of the tire due to imposing special structural requirements on the tire.

It is to be noted that "lateral position" is a lateral position of the wheel and is the same as a lateral position of the vehicle when a steered angle of wheels including the wheel is zero. "Laterally outer" is a side opposite to a center of the vehicle in the lateral direction of the vehicle and "laterally inward" is a side of the center of the vehicle in the lateral direction of the vehicle. Further, "the range between the lateral position of the laterally outer peripheral edge of the rim and the lateral position of the tip of the laterally outer rim guard" is a concept including a lateral position of the laterally outer peripheral edge of the rim and a lateral position of the tip of the laterally outer rim guard.

In one aspect of the present disclosure, lateral positions of the laterally outer tips of the convex portions are the same as the lateral position of the tip of the laterally outer rim guard.

According to the above aspect, lateral positions of the laterally outer tips of the convex portions are the same as the lateral position of the tip of the laterally outer rim guard. Accordingly, it is possible to effectively reduce a space between an air flow on the downstream side of the laterally outer rim guard and the wheel and to effectively reduce the risk of the generation of vortex flows in the region of the space while reducing the possibility that the convex portions become flow resistance against the air flow on the downstream side of the laterally outer rim guard.

In another aspect of the present disclosure, a radially inner end portion of each convex portion has an inclined surface whose protrusion height gradually decreases toward the radially inward direction.

According to the above aspect, a radially inner end portion of each convex portion has an inclined surface whose protrusion height gradually decreases toward the radially inward direction, so that an air flow flowing along each convex portion on the front side of a rotation axis of the wheel flows along the inclined surface. Therefore, as compared to where no inclined surface is provided, it is possible to reduce the possibility that an air flow separates from the wheel when passing the convex portion, thereby generating vortex flows between the air flow and the wheel. Furthermore, on the rear side of the rotation axis of the wheel, a resistance that each convex portion gives to the air flow can be reduced.

In another aspect of the, present disclosure, each convex portion extends radially outward to the laterally outer peripheral edge of the rim.

According to the above aspect, each convex portion extends radially outward to the laterally outer peripheral edge of the rim, so that a distance between the laterally outer rim guard and a radially outer end of each convex portion can be made smaller as compared to where each convex portion does not extend radially outward to the laterally outer peripheral edge of the rim. Accordingly, it is possible to reduce the possibility that vortex flows of air are generated between the laterally outer rim guard and the radially outer ends of the convex portions.

In another aspect of the present disclosure, the laterally outer tip of each convex portion is in a plane shape perpendicular to a rotation axis of the wheel.

According to the above aspect, the laterally outer tip of each convex portion is in a planar shape perpendicular to a rotation axis of the wheel, so that the air flow on the downstream side of the rim guard can flow linearly along the tip of each convex portion. Accordingly, it is possible to form a more preferable laminar flow of the air as compared to where each convex portion has a concavoconvex portion, a curved portion, or the like at the tip of the convex portion.

In another aspect of the present disclosure, the second plurality of spokes have a larger circumferential width than the spokes other than the second plurality of spokes.

According to the above aspect, the second plurality of spokes have a larger circumferential width than the spokes other than the second plurality of spokes. The width in the circumferential direction of the convex portions can be made larger as compared to where the convex portions are provided at the outer ends of the spokes other than the second plurality of spokes, and the possibility that an air flow is separated from the wheel can effectively be reduced.

In another aspect of the present disclosure, the second plurality are the same as the first plurality, and the convex portions are provided on the outer ends of all the spokes.

According to the above aspect, the convex portions are provided on the outer ends of all the spokes, so that it is possible to effectively reduce the possibility that an air flow separates from the wheel as compared to where the second plurality is smaller than the first plurality and the convex portions are provided only at the outer ends of some of the spokes.

Other objects, other features and attendant advantages of the present disclosure will be readily understood from the description of the embodiments of the present disclosure described with reference to the following drawings.

DETAILED DESCRIPTION

Figure 1:
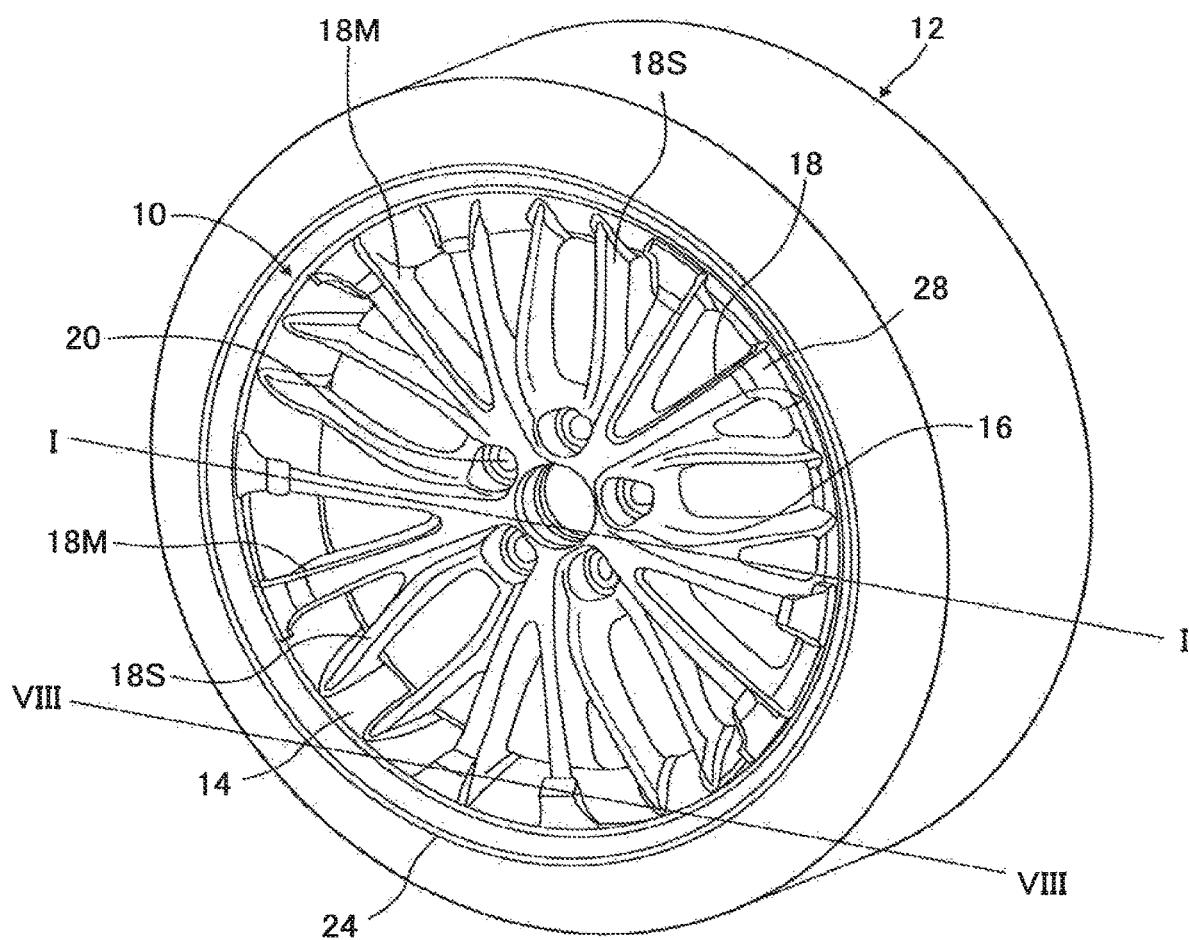
FIG. 1 is a perspective view showing a first embodiment of a spoke wheel according to the present disclosure in a state where a tire having a rim guard is mounted.

The present disclosure will now be described in detail with reference to the accompanying drawings.

First Embodiment

The spoke wheel 10 according to the first embodiment of the present disclosure comprises a rim 14 for supporting a tire 12, a hub 16 positioned radially inwardly with respect to the rim, and twenty spokes 18 each integrally connected to the rim and the hub at the outer end and the inner end, respectively. The wheel 10 is formed from a metal such as an aluminum alloy and cooperates with the tire 12 to form an enclosed space extending annularly around the rim 14. Reference numeral 20 denotes a bolt hole provided in the hub 16 for receiving a bolt fixed to a knuckle not shown in the drawing.

The rim 14 is composed of a pair of bead support portions 14B for receiving a bead portion 12B of the tire 12 and a tubular portion 14T integrally connecting the pair of bead support portions, and extends around a rotation axis 22 of the wheel 10. As is well known, the spokes 18 are shifted laterally outwardly with respect to a lateral center 14C of the rim 14 so as to be able to receive a knuckle and a brake device and the like (not shown in the drawing) radially inside the tubular portion 14T.

The tire 12 is a low profile tire, and has rim guards 24 on outer surfaces of sidewall portions 12S adjacent to the laterally outer side and inner side bead portions 12B. Each of the rim guards 24 is formed, of rubber constituting the sidewall portion 12S integrally with the sidewall portion, protrudes from the sidewall portion, and extends all around an axis 26 of the tire 12 (the same as the rotation axis 22 of the wheel 10). A tip 24E of each rim guard 24 is positioned on the opposite side of the lateral center 14C of the rim 14 with respect to a laterally outer peripheral edge 14BP of the corresponding bead support portion 14B.

In the illustrated embodiment, the spokes 18 consist of ten main spokes 18M and ten sub spokes 18S having a smaller circumferential width than the main spokes. A pair of sub spokes 18S are arranged between the two pairs of main spokes 18M, and the main spokes 18M and the sub spokes 18S extend radially with respect to the hub 16. Each pair of main spokes 18M is evenly spaced circumferentially around the rotation axis 22 of the wheel 10 and each sub spoke 18S is evenly spaced circumferentially from the adjacent main spokes 18M. The spacing in the circumferential direction of each pair of sub spokes 18S is the same.

Figure 3:
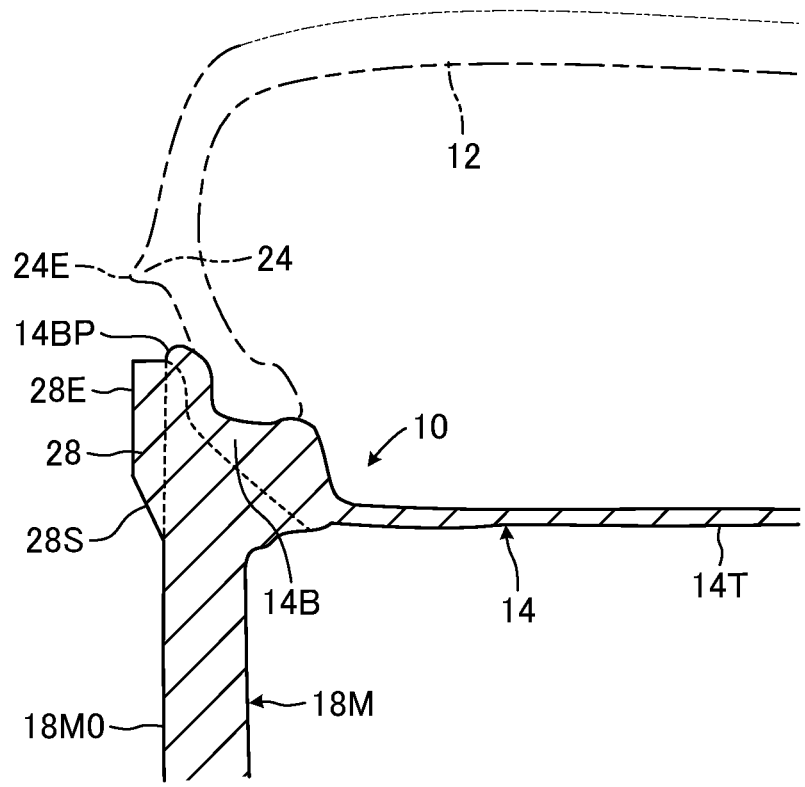
FIG. 3 is an enlarged partial cross-sectional view showing a main part of the wheel of the first embodiment further enlarged.

In particular, in the first embodiment, the width in the circumferential direction of the outer end portion of each main spoke 18M gradually increases as going outward in the radial direction. As shown in FIG. 3, a laterally outer surface, i.e., a laterally outer surface 18MO, of each main spoke 18M except for the inner end thereof is substantially aligned with a laterally outer peripheral edge 14BP of the bead support 14B on the lateral outside of the rim 14. A convex portion 28 protruding outward in the lateral direction and extending in the radial direction is provided at the outer end portion of each main spoke 18M. Therefore, the first plurality, which is the total number of the spokes 18, is 20 and the second plurality, which is the number of the spokes 18 provided with the convex portions 28, is 10.

A lateral position of a laterally outer tip 28E of each convex portion 28 is the same as the lateral position of the tip 24E of the laterally outer rim guard 24. In the illustrated first embodiment, the laterally outer tip 28E of each convex portion 28 is in a planar shape extending along a plane (not shown) perpendicular to the rotation axis 22 of the wheel 10 through the tip 24E of the laterally outer rim guard 24. Each convex portion 28 extends radially from a position radially inward of the bead support portion 14B on the lateral outside of the rim 14 to substantially the laterally outer peripheral edge 14BP of the bead support portion 14B. The radially inner end portion of each convex portion 28 has an inclined surface 28S whose protruding height gradually decreases toward the radially inward direction. Further, both circumferential side portions of each convex portion 28 have inclined surfaces whose projection height gradually decreases with increasing distance from each other. It is to be noted that the inclined surfaces may be omitted and both circumferential side portions of the convex portion 28 may be parallel to the rotation axis 22 of the wheel 10.

Since the convex portions 28 are provided only at the outer end portions of the ten main spokes 18M, they are intermittently arranged in the circumferential direction around the rotation axis 22 of the wheel 10. However, when a vehicle travels, the wheel 10 rotates at high speed around the rotation axis 22, so that the ten convex portions 28 cooperate with each other to function as if they form an annular protrusion that continuously extend around the rotation axis 22.

Figure 2:
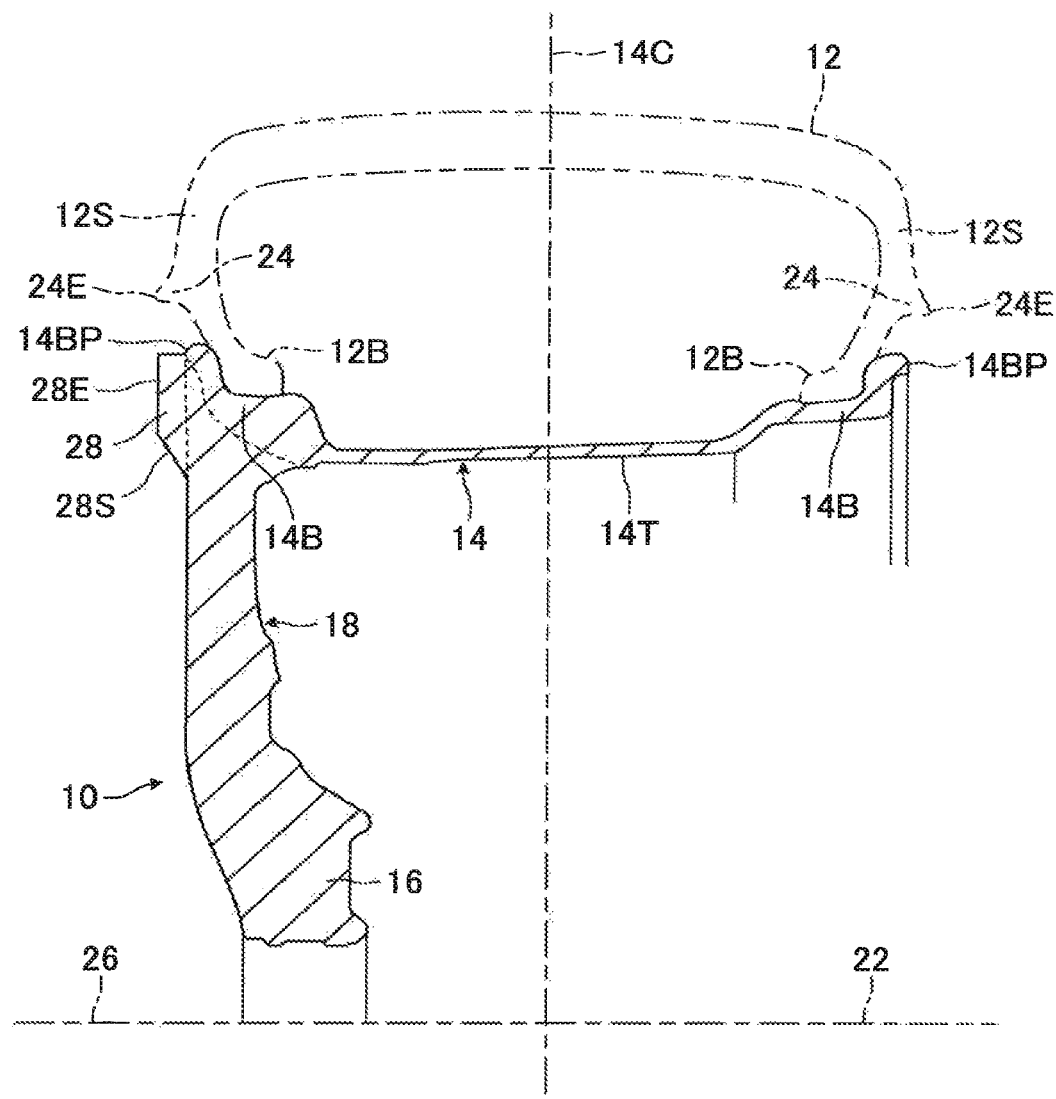
FIG. 2 is an enlarged partial cross-sectional view of the wheel taken along a cutting plane, extending horizontally through a line I-I shown in FIG. 1.
Figure 4:
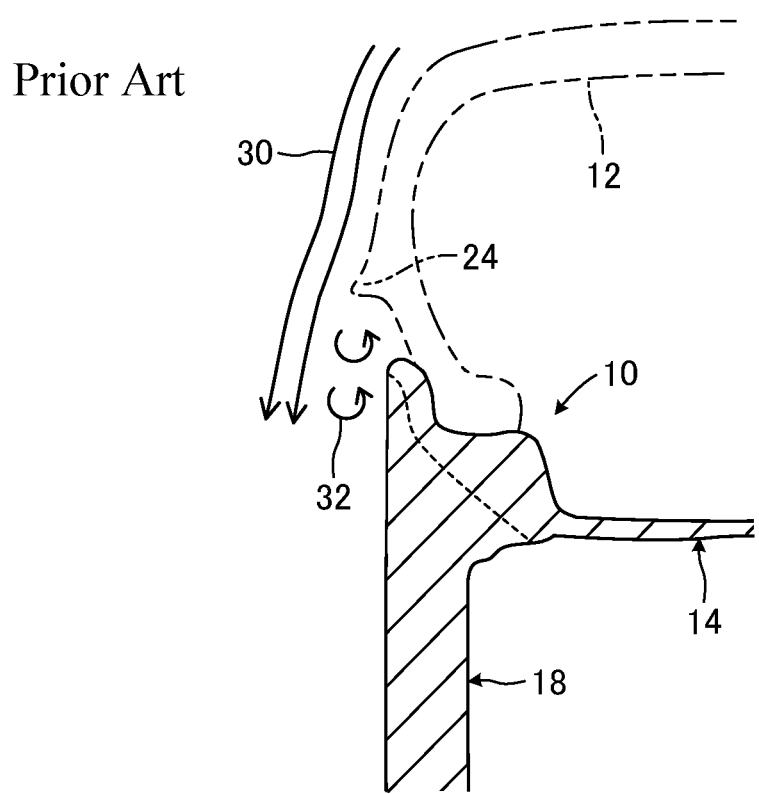
FIG. 4 is an enlarged partial cross-sectional view showing an air flow flowing on the lateral outside of the tire for a conventional spoke wheel in which no convex portion is provided at the outer end of each spoke.
Figure 6:
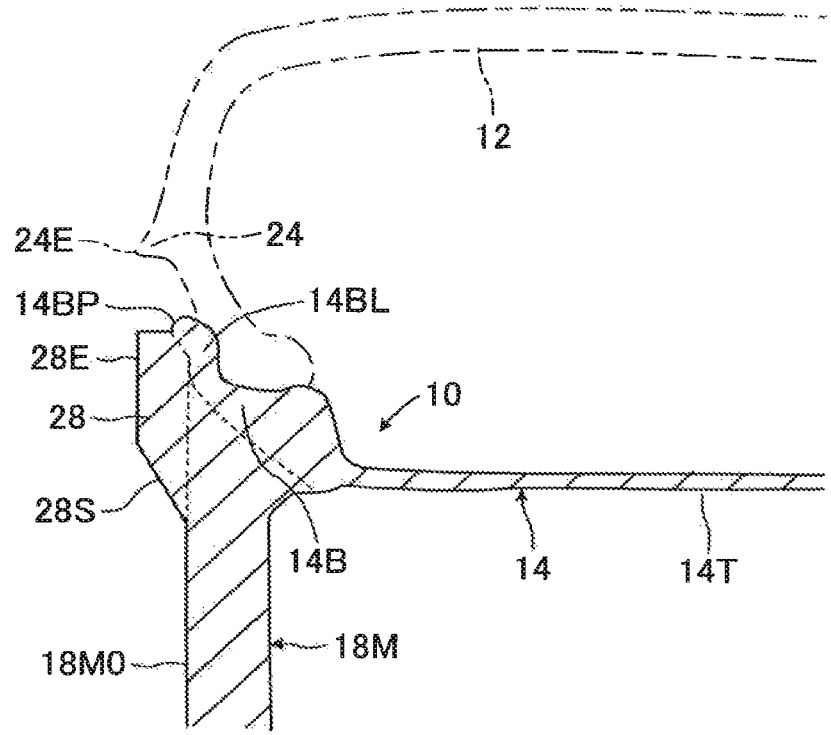
FIG. 6 is an enlarged partial cross-sectional view similar to FIG. 3 showing an enlarged main part of a spoke wheel according to a second embodiment of the present disclosure.
Figure 7:
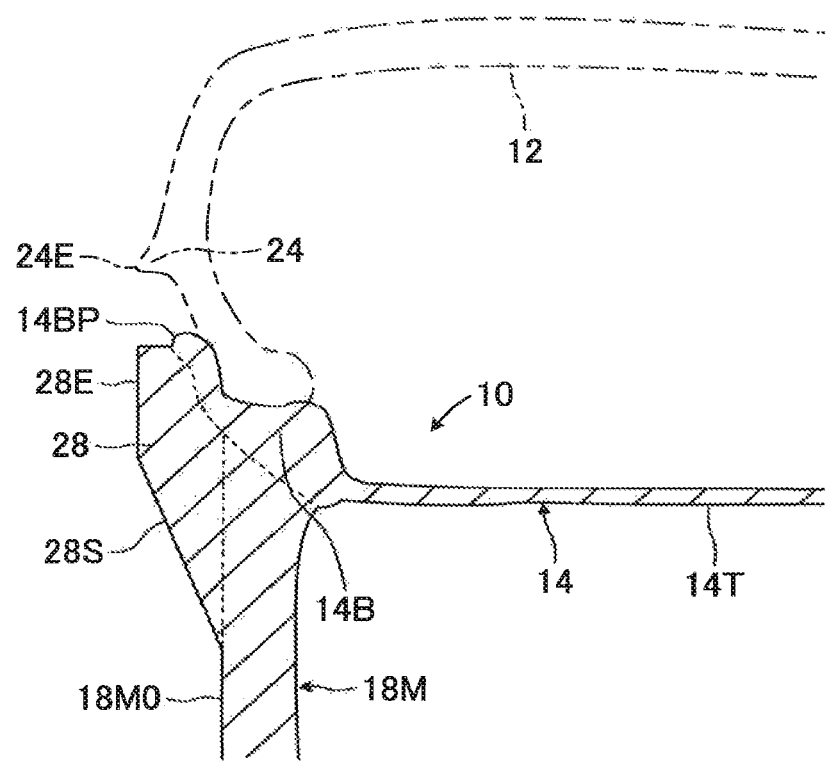
FIG. 7 is an enlarged partial cross-sectional view similar to FIG. 3 showing an enlarged main part of a spoke wheel according to a third embodiment of the present disclosure.
Figure 9:
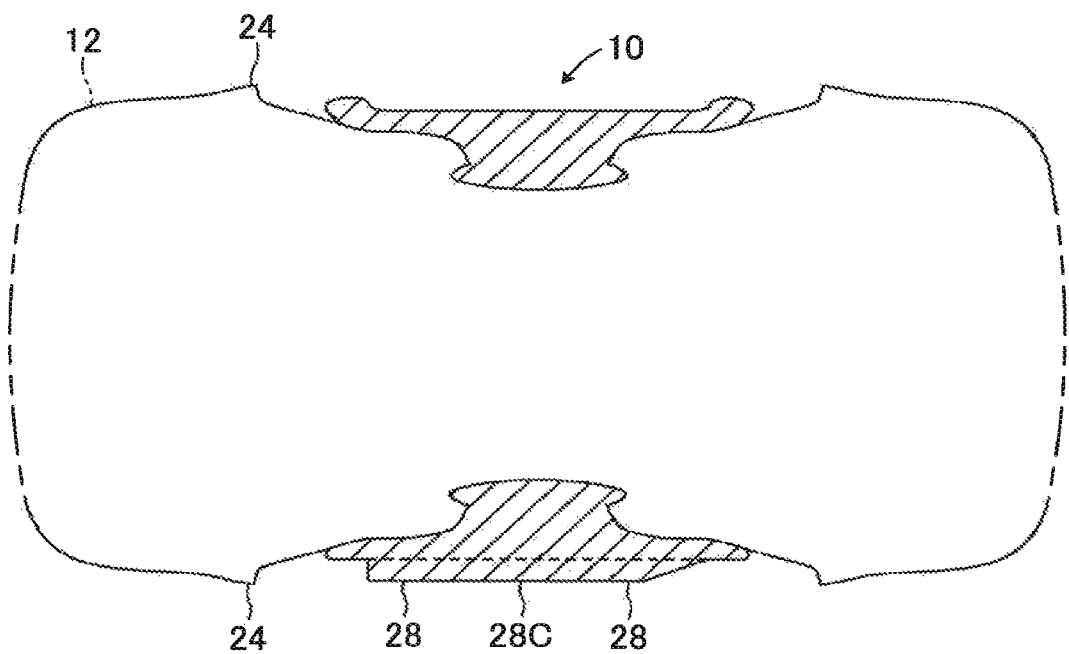
FIG. 9 shows a spoke wheel according to a fourth embodiment constructed as a second modification of the first embodiment with a cross section taken along the cutting plane extending horizontally through the line VIII-VIII shown in FIG. 1.

FIG. 4 shows an air flow flowing on the lateral outside of the tire for a conventional spoke wheel with no convex portion at an outer end of each spoke. In FIG. 4, the same reference numerals as those denoted in FIGS. 1 to 3 are attached to the same members as those shown in FIGS. 1 to 3. This also applies to FIGS. 6, 7, and 9 showing other embodiments.

In a conventional spoke wheel, when a vehicle (not shown) runs, an air flow 30 flowing on the lateral outside of the tire 12 is deflected away from the tire 12 and the wheel 10 by the rim guard 24. In the conventional spoke wheel, since no convex portions corresponding to the convex portions 28 are provided, a space between the air flow 30 on the downstream side of the rim guard 24 and the wheel 10 is large, and the vortex flows 32 are generated in the region of the space, and air resistance resulting from the vortex flows is generated.

Figure 5:
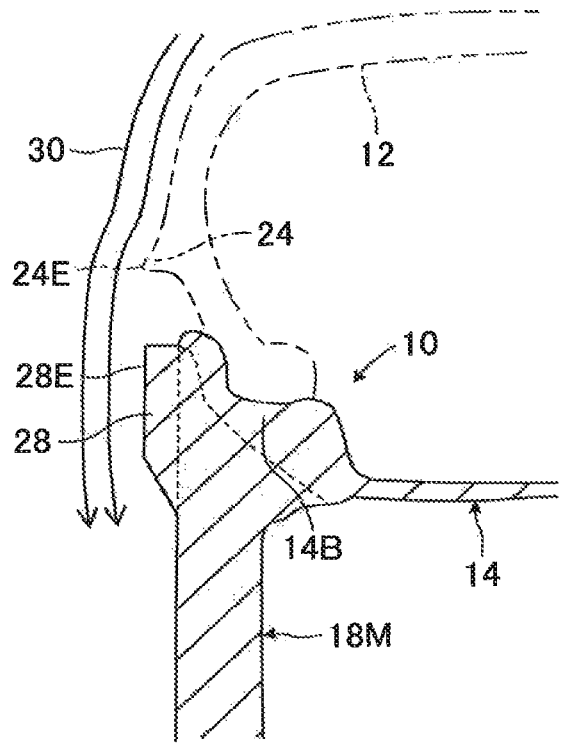
FIG. 5 is an enlarged partial sectional view showing an air flow flowing on the lateral outside of the tire for the spoke wheel of the first embodiment.

On the other hand, according to the first embodiment, as described above, the ten convex portions 28 function like an annular protrusion continuously extending around the rotation axis 22, and a lateral outer surface of each annular protrusion is the same as the lateral position of the tip 24E of the laterally outer rim guard 24. Therefore, as shown in FIG. 5, since the distance between the air flow 30 on the downstream side of the rim guard 24 and the wheel 10 is small, vortex flows are difficult to be generated in the region of the space, thereby reducing the air resistance caused by the vortex flows. Furthermore, although not shown in the figure, it is possible to reduce a resistance that the rim guard 24 exerts on an air flow on the rear side of the rotation axis 22, as compared to where no convex portions 28 are provided.

Table 1 below shows air resistance calculated using the computational fluid dynamics (CFD) for the first embodiment, the first modification and the first comparative example, with the air resistance of the conventional spoke wheel as a reference value 100. The spoke wheel of the first modified example is a wheel in which convex portions corresponding to the convex portions 28 are provided at the outer end portions of all the main spokes 18M and the sub spokes 18S. The spoke wheel of the first comparative example is a wheel in which a convex portion corresponding to the convex portions 28 is provided all around a rotation axis of the wheel.

|  | Conventional Spoke Wheel | First Embodiment | First Modification | First Comparative Example |
|---|---|---|---|---|
| Presence or Absence of Convex Portion | Absent | Present (10) | Present (20) | Present (All Around) |
| Air Resistance | 100 | 98.9 | 98.1 | 97.4 |

From Table 1, it can be seen that although the air resistance is lowest in the first comparative example and then the first modified example, according to the first embodiment, the air resistance can be made lower than that of the conventional spoke wheel. It can also be seen that the difference between the air resistances of the first embodiment and the first modified example is small, and even if the convex portions are not provided on all the spokes, the air resistance can be reduced. Further, it can be understood from the comparison between the air resistances of the first embodiment and the first modification that convex portions are preferably to be provided at the outer end portions of all the spokes.

Second Embodiment

In the second embodiment of the spoke wheel according to the disclosure shown in FIG. 6, the laterally outer surface 18MO excluding the inner end portion of the main spoke 18M is substantially aligned with an outer surface of a base of a lip portion 14BL of the laterally outer bead support portion 14B of the rim 14. A convex portion 28 protruding outward in the lateral direction and extending in the radial direction is provided at an outer end portion of each main spoke 18M. The other points of the second embodiment are configured similarly to the first embodiment described above.

In FIG. 6 and FIGS. 7 and 9 described later, members and parts corresponding to the members and the parts shown in FIG. 2 are given the same reference numerals as those given in FIG. 2.

According to the second embodiment, the convex portions 28 function in the same manner as the convex portions of the first embodiment, and the space between an air flow on the downstream side of the laterally outer rim guard 24 and the wheel 10 can be reduced, so that it is possible to reduce the possibility that vortex flows are generated in the region of the space and to reduce air resistance caused by vortex flows.

Third Embodiment

In the third embodiment of the spoke wheel according to the disclosure shown in FIG. 7, the laterally outer surface 18MO except the inner end portion of each main spoke 18M is located further laterally inward than in the second embodiment. A convex portion 28 protruding outward in the lateral direction and extending in the radial direction is provided at the outer end portion of each main spoke 18M. The other points of the third embodiment are configured similarly to the first embodiment described above.

Notably, a height of each convex portion 28 in the third embodiment is larger than the height of the convex portions in the first and second embodiments. Therefore, an inclination angle of the inclined surface 28S is preferably smaller than the inclination angle of the inclined surfaces in the first and second embodiments so that the possibility of separation of an air flow flowing along the inclined surface 28S of each convex portion 28 is reduced.

Also in the third embodiment, the convex portions 28 function similarly to the convex portions of the first embodiment, and the space between an air flow on the downstream side of the laterally outer rim guard 24 and the wheel 10 can be reduced. Therefore, it is possible to reduce the possibility of generation of vortex flows in the region of the apace, and it is possible to reduce air resistance caused by vortex flows.

Fourth Embodiment

Figure 8:
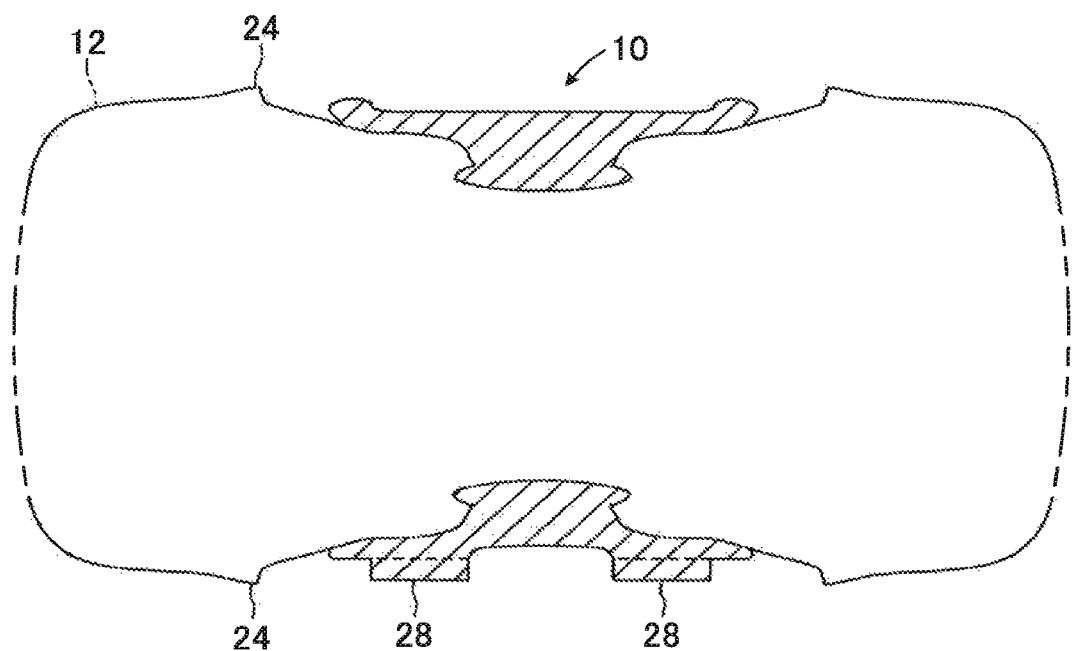
FIG. 8 is a cross-sectional view of the spoke wheel of the first embodiment taken along a cutting plane extending horizontally through a line VIII-VIII shown in FIG. 1.

FIGS. 8 and 9 are sectional views showing the first embodiment and a fourth embodiment configured as a second modification of the first embodiment, respectively. FIGS. 8 and 9 are cross-sectional views taken along a plane extending horizontally through the line VIII-VIII shown in FIG. 1.

In the first embodiment, the convex portions 28 are spaced apart from each other in the circumferential direction of the wheel 10. Therefore, as shown in FIG. 8, the convex portions 28 are spaced from each other also above and below the rotation axis 22 of the wheel 10. Thus, an air flow flowing on the lateral outside of the wheel 10 above and below the rotation axis 22 of the wheel 10 flows intermittently along the convex portions 28. As a result, when the air flow flows between the two convex portions 28, vortex flows may be generated.

On the other hand, in the fourth embodiment, the convex portions 28 provided at the outer end portions of the two main spokes 18M directly adjacent to each other without the sub spoke 18S being present in the middle are connected, as shown in FIG. 9, by a connecting portion 28C extending in a circular arc shape along the circumferential direction. Thus, an air flow flowing on the lateral outside of the wheel 10 above and below the axis 22 of the wheel 10 flows continuously along the convex portions 28 and the connecting portions 28C. Therefore, it is possible to prevent the generation of vortex flows when the air flow flows between the two convex portions 28.

It is preferable that a laterally outer surface of each connecting portion 28C be in the same plane as the surface of the laterally outer tip of each convex portion 28, but it may be located laterally inward of the surface of the laterally outer tip of each convex portion 28. In that case, it is preferable that the laterally outer surface of each connecting portion 28C be smoothly connected to the surfaces of the laterally outer tips of the convex portions 28.

As understood from the above description, according to the above-described embodiments, a space between an air flow on the downstream side of the laterally outer rim guard 24 and the laterally outer surface of the wheel 10 in front of the rotation axis 22 is made small by the rotating convex portions 28, so that it is possible to reduce the possibility of the generation of vortex flows in the region of the space and to reduce air resistance caused by the vortex flows. Furthermore, as described above, it is possible to reduce the resistance that the rim guard 24 gives to an air flow behind the rotation axis 22, as compared to where no convex portion 28 is provided.

Further, according to the above-described embodiments, the convex portions 28 are provided on the outer end portions of the main spokes 18M, and are spaced apart from each other in the circumferential direction. Therefore, it is possible to reduce a weight of the wheel 10 and to prevent the aesthetic property of the wheel from deteriorating, as compared to where the convex portions extend over the entire circumference to form an annular shape.

Furthermore, according to the above-described embodiments, no special structural requirement such as forming a planar portion on an laterally outer sidewall portion 12S of the tire 12 is not imposed on the tire. Therefore, it is possible to avoid deterioration of the performance of the tire due to imposing special structural requirements on the tire.

Further, according to the above-described embodiments, the lateral position of the laterally outer tip 28E of each convex portion 28 is the same as the lateral position of the tip 24E of the laterally outer rim guard 24. Accordingly, it is possible to effectively reduce a space between an air flow on the downstream side of the rim guard and the wheel 10 and to effectively reduce the risk of the generation of vortex flows in the region of the space while reducing the possibility that the convex portions become flow resistance against the air flow 30 on the downstream side of the rim guard.

Further, according to the above-described embodiments, the radially inner end portion of each convex portion 28 has the inclined surface 28S whose protrusion height gradually decreases in the radially inward direction, so that an air flow 30 flowing along each convex portion on the front side of the rotation axis 22 flows along the inclined surface. Therefore, as compared to where no inclined surface is provided, it is possible to reduce the possibility that an air flow separates from the wheel 10 when passing the convex portions, thereby generating vortex flows between the air flow and the wheel. Furthermore, on the rear side of the rotation axis 22, a resistance that each convex portion 28 gives to the air flow can be reduced.

Further, according to the above-described embodiments, the convex portions 28 extend radially outward to the laterally outer peripheral edge 14BP of the rim 14. Therefore, a distance between the laterally outer rim guard 24 and the radially outer ends of the convex portions can be made smaller as compared to where the convex portions do not extend radially outward to the laterally outer peripheral edge of the rim. Accordingly, it is possible to reduce the possibility that vortex flows of air are generated between the rim guard and the radially outer ends of the convex portions.

Further, according to the above-described embodiments, the laterally outer tip 28E of each convex portion 28 is in a planar shape perpendicular to the rotation axis 22 of the wheel 10, so that the air flow 30 on the downstream side of the laterally outer rim guard 24 can flow linearly along the tip of each convex portion. Accordingly, it is possible to form a more preferable laminar flow of the air as compared to where each convex portion has a concavo-convex portion, a curved portion or the like at a tip of each convex portion.

Further, according to the above-described embodiments, the main spokes 18M, which are the second plurality of spokes, have a circumferential width larger than that of the sub spokes 18S. Therefore, in a wheel having the main spokes and the sub spokes, the width in the circumferential direction of the convex portions 28 can be made larger as compared to where the convex portions are provided on the outer end portions of the sub spokes 18S, and the possibility that the air flow 30 is separated from the wheel 10 can effectively be reduced.

Further, according to the above-described embodiments, both side portions of each convex portion 28 in the circumferential direction have inclined surfaces whose projection height gradually decreases with increasing distance from each other. Consequently, as compared to where both circumferential side portions of each convex portion 28 do not have inclined surfaces, it is possible to reduce the degree to which an air flow 30 flowing on the lateral outside of the wheel 10 during the wheel rotates is disturbed by the side portions of each convex portion 28.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described embodiments, the lateral position of the laterally outer tip 28E of each convex portion 28 is the same as the lateral position of the tip 24E of the laterally outer rim guard 24. However, the lateral position of the laterally outer tip 28E of each convex portion 28 only has to be between the lateral position of the laterally outer peripheral edge 14BP of the bead support portion 14B of the rim 14 and the lateral position of the tip 24E of the rim guard 24. In the latter configuration, as compared to where the lateral position of the tip 24E of the rim guard 24 is laterally inward of the lateral position of the laterally outer peripheral edge 14BP of the bead support portion 14B, it is possible to reduce the possibility that an air flow 30 is separated from the wheel 10 and vortex flows are generated.

Further, in the above-described embodiments, the spokes 18 are composed of the main spokes 18M and the sub spokes 18S, and a pair of sub spokes 18S are arranged between two pairs of main spokes 18M. However, one sub spoke 18S may be arranged between two pairs of main spokes 18M, and the main spoke 18M and the sub spoke 18S may be alternately arranged in the circumferential direction. Each main spokes 18M has a circumferential width larger than that of each sub spoke 18S, but all the spokes may have the same circumferential width. Furthermore, the disclosure may be applied to wheels in which all the spokes are identical to each other.

Further, in the above-described embodiments, the convex portions 28 are provided on the outer end portions of the main spokes 18M. However, the convex portions 28 may be provided on the outer end portions of all the spokes. In that case, it is possible to effectively reduce the possibility of separating an air flow from the wheel, as compared to where the convex portions are provided only on the outer end portions of some of the spokes.

Further in the above-described embodiments the laterally outer tip 28E of each convex portion 28 is planar perpendicular to the rotation axis 22 of the wheel 10. However, the laterally outer tips 28E of the convex portions 28 may have a dome shape, may have gentle unevenness, and may further be inclined so that the height gradually decreases from the radially outer end portion of each convex portion 28 to the radially inner end portion.

What is claimed is:

1. A spoke wheel comprising:
   a rim for supporting a tire having rim guards;
   a hub located radially inwardly with respect to the rim; and
   a first plurality of spokes integrally connected with the rim and the hub at an outer end and an inner end, respectively, and extending radially with respect to the hub, laterally outer surfaces of the outer ends of the spokes and a laterally outer peripheral edge of the rim being located laterally inwardly with respect to a tip of a laterally outer rim guard,
   wherein outer ends of a second plurality of spokes among the first plurality of spokes are provided with convex portions projecting laterally outwardly and extending in the radial direction, and
   wherein lateral positions of laterally outer tips of the convex portions lie in a range between a lateral position of the laterally outer peripheral edge of the rim and a lateral position of the tip of the laterally outer rim guard.

2. The spoke wheel according to claim 1, wherein lateral positions of the laterally outer tips of the convex portions are the same as the lateral position of the tip of the laterally outer rim guard.

3. The spoke wheel according to claim 1, wherein a radially inner end portion of each convex portion has an inclined surface whose protrusion height decreases toward the radially inward direction.

4. The spoke wheel according to claim 1, wherein each convex portion extends outward to the laterally outer peripheral edge of the rim.

5. The spoke wheel according to claim 1, wherein the laterally outer tip of each convex portion is in a plane shape perpendicular to a rotation axis of the wheel.

6. The spoke wheel according to claim 1, wherein the second plurality of spokes have a larger circumferential width than spokes other than the second plurality of spokes.

7. The spoke wheel according to claim 1, wherein the second plurality of spokes are the same as the first plurality of spokes, and the convex portions are provided on the outer ends of all the spokes.

\* \* \* \* \*